May 18, 1965   H. L. BROWN, JR., ETAL   3,184,714
APPARATUS FOR USE WITH A CREDIT CARD
Filed April 15, 1963   6 Sheets-Sheet 1

INVENTORS
Herbert L. Brown, Jr.
John D. Helms

BY

ATTORNEY

INVENTORS
Herbert L. Brown, Jr.
John D. Helms

United States Patent Office 3,184,714
Patented May 18, 1965

3,184,714
APPARATUS FOR USE WITH A CREDIT CARD
Herbert L. Brown, Jr., and John D. Helms, Dallas, Tex., assignors to Texas Instruments Incorporated, Dallas, Tex., a corporation of Delaware
Filed Apr. 15, 1963, Ser. No. 272,974
2 Claims. (Cl. 340—149)

The present invention relates to apparatus for use with a credit card and more particularly to apparatus which is capable of checking the validity of a credit card, facilitating the automatic dispensing of products to credit card holders on either a self-service basis or an attendant controlled basis.

Credit cards have achieved an extremely wide acceptance and are utilized for purchasing virtually every type of service and product. In view of the millions of people having credit cards in their possession, it is only reasonable to expect that a small percentage, but yet a large number, will become bad credit risks and hence make it desirable that the credit card be recovered from such a person's possession and that additional credit not be extended to such a user. Many other cards are stolen or lost or otherwise come into the possession of persons other than those to whom it was originally issued, again creating a situation in which it is desirable that the credit card be removed from circulation.

At the present time, repossession of credit cards by the issuing company is effectuated by the expedient of writing letters requesting the return of the card and by issuing to the commercial establishments honoring the credit card periodic lists of card numbers which are no longer to be honored and which are to be repossessed by the establishment and returned to the issuing agency in the event the card should be discovered. Needless to say, however, many establishments fail to take advantage of such lists of invalid cards because of the time required to check each card presented against the list, and in some instances, the establishment does not wish to chance possible customer embarrassment.

In accordance with the present invention, apparatus for use with a credit card having an identification number is provided. The apparatus provided comprises means for reading the identification number and means for comparing the identification number read against a group of stored identification numbers consisting of either invalid card numbers or valid card numbers. If the comparator means provides a signal indicating a negative comparison of the card identification number against one of the stored identification numbers, wherein by negative comparison it is meant that the comparison indicates the card to be invalid, means are provided for rejecting the card. If, on the other hand, the comparator means produces a signal indicating a positive comparison of the identification number read, wherein by positive comparison it is meant that the comparison indicates the card to be valid, a signal is produced indicating that the transaction should proceed.

The present invention is especially applicable to the retail sale and distribution of gasoline, as it is most often accomplished using a credit card. Thus, it is common for various gasoline companies to distribute to their customers credit cards bearing the customer's name and an identification number. Following delivery of the gasoline, the attendant transcribes the name and identification number from the card onto a charge ticket along with the quantity of merchandise delivered and the price of merchandise. One copy of the charge ticket is provided for the buyer's record and another copy is forwarded to the distributor for billing purposes.

The principles of the present invention will, therefore, be described with reference to a specific preferred embodiment of the present invention wherein an improved gasoline vending apparatus is provided. The credit card used according to the specific example to be described is a 50 bit machine coded card of the type commonly used in the gasoline industry. In practicing this preferred embodiment of the invention, the credit card is inserted into a slot provided in the apparatus by the customer or attendant. A switch contained within the slot is closed as the card is inserted. When the switch closes, power is applied to energize a card locking means and also to energize the card reading means and the comparator means for comparing the card number read against a list of stored identification numbers corresponding to either valid card identification numbers or invalid card identification numbers. The card locking means is provided for locking the card in the slot until a release signal is generated by the apparatus.

In general, it is preferable to compare the credit card identification number against the invalid identification numbers, due to the relative quantities involved. Thus, it is possible that there would be several million valid card numbers, but only a few thousand invalid card numbers. It will be appreciated, however, that even though there are only a few thousand invalid card numbers, it would be a time consuming task to visually compare each card presented against such a list.

As the identification number on the card is read, a parity check of the number of bits with information the machine is reading from the card is made to check the proper reading of the card by the machine. The card is immediately returned to the customer in the event the parity check reveals that the card reader does not appear to be operating satisfactorily. If, on the other hand, the parity check indicates that the card reader is operating satisfactorily, the number on the credit card is compared against a list of invalid numbers. If the comparator produces an output indicating the presence of an invalid card, the card may be returned, the card may be mutilated, or the card may be retained by the machine and an appropriate alarm indicating the presence of an invalid card provided. The particular steps to be taken in the event an invalid card is discovered will, of course, depend upon the action the particular business feels should be taken to remove invalid cards from circulation.

The presence of a valid card is indicated by a signal produced after the identification number on the card has been checked against all of the stored identification numbers without an indication of an invalid card. The signal indicating the presence of a valid card is effective to permit the handle of the pump hose to be removed from the pump and also to apply power to the pump at such time as the handle of the hose is removed. Thus, at such time as the customer or operator removes the hose, the pump will start and the vehicle or container can be filled with the desired amount of gasoline.

The amount of gas withdrawn and the total price are indicated in the manner conventional with most modern gasoline pumps. A printer contained within the apparatus of the present invention is driven, suitably by the meter and computer associated with the gasoline pump, to reflect the amount of gas and total price indicated on the gasoline pump.

At such time as the desired amount of fuel has been withdrawn, the hose is replaced, cutting the pump off and energizing a solenoid which is effective to release a crank handle provided on the case of the apparatus. Thereafter, by rotating the crank handle, the apparatus is caused to print an invoice, one copy of which is stored in the machine, reset the machine, and return the credit card and a copy of the invoice to the customer. It is not possible to rotate the handle until the hose has been replaced, nor can the hose be removed after the crank handle has been turned. The customer or potential customer can only regain possession of the credit card by turning the crank handle, in the event of a valid card. As mentioned before, if the card is considered invalid, it may be mutilated or retained by the machine, as desired.

The apparatus provided by the present invention possesses several important advantages over prior art apparatus. The most important advantage is the capability of the apparatus provided by the present invention to determine the validity or invalidity of the credit card submittted to the apparatus, thereby making it possible for the machine to recognize and remove invalid cards from circulation. Because of the reliability of the system, 24 hour vending may be obtained without the necessity of an operator, with an accompanying increase in customer convenience and security which accrues from the availability of gasoline during hours that the station is normally closed.

The temptation to rob such a station is minimized in that money is not used in the transaction and the possibility of pilferage is minimized in that only one product can be purchased at the vending station. By imprinting the cost and quantity data, as well as the customer identification number, in machine code, completely automatic processing of billing can be obtained without the necessity of transcribing the quantity and price in the manner presently required.

Although the above mentioned specific example of the apparatus provided by the present invention finds utility primarily in a self-service type operation, such a system will also provide many advantages in a station where attendants are present in that it will enable the attendant to recover and check any card which appears invalid and also minimizes errors in transcribing the quantity and price information from the pump meter. If desired, the apparatus can be provided with keys for indicating the sale of additional products and the price of such additional products. The invention can also advantageously be adapted for many other types of commercial transactions wherein credit cards are utilized.

Many objects and advantages of the present invention will become apparent to those skilled in the art as the following detailed description of one specific example of the invention unfolds when taken in conjunction with the appended drawings wherein like reference numerals denote like parts and in which.

Figure 1:
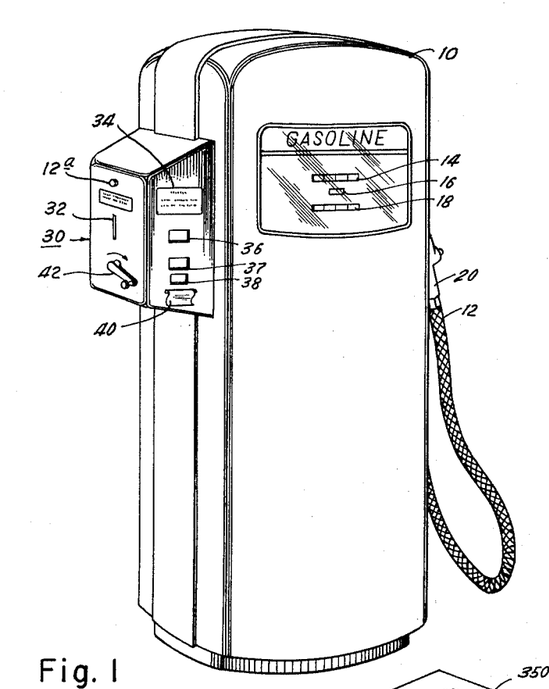
FIGURE 1 is a perspective view of a preferred specific example of the invention adapted for use with a gasoline pump.

The invention will be described with regard to a particular embodiment especially adapted for the automatic dispensing of gasoline. Accordingly, in FIGURE 1 of the drawings there is shown a conventional type of gasoline pump which consists of a housing 10 which acts as a cover and support for a pump, not shown, which pumps the gasoline or other product to be distributed from a storage tank through a hose 12. As the gasoline or other product is delivered from the pump, the quantity delivered is metered and indicated through the windows 14. The price per gallon of the merchandise delivered is indicated at the window 16 and a computer is provided for determining the total cost of the merchandise delivered and indicating the total price at the window 18. The handle 20 of the hose 12 normally fits in a well of the housing 10 whereby when the handle 20 is in place, the switch which supplies power to the pump motor will be off, making it necessary that the hose be removed from the pump housing before the switch can be turned on.

The apparatus provided by the present invention is denoted generally by the reference numeral 30. As viewed in FIGURE 1, the apparatus 30 includes a slot 32 into which a credit card may be inserted. An instruction plate 34 imprinted with the necessary directions for operating the meter may be affixed to the cover of the apparatus 30. Lights 36, 37 and 38, suitably of different colors, may be provided for indicating the presence of a valid or invalid card. At the completion of the transaction, a receipt 40 is provided to the customer upon rotation of the crank handle 42.

Figures 2, 16:
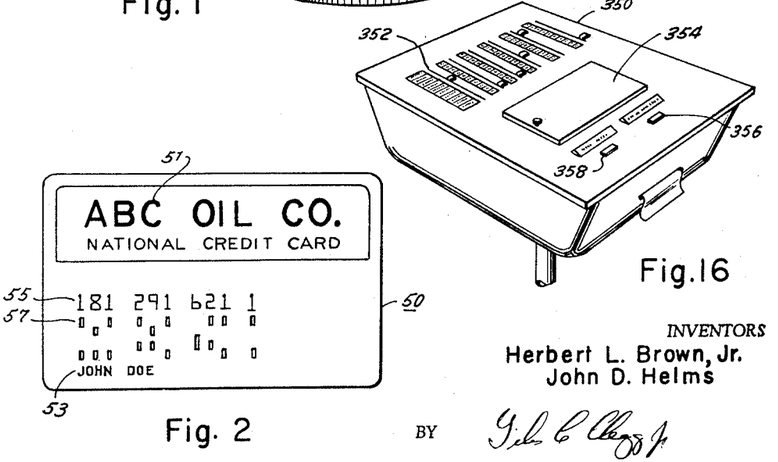
FIGURE 2 is a plan view of a conventional bar coded credit card.
FIGURE 16 is a perspective view illustrating an embodiment of the invention suitable for use by a clerk in billing a customer for other than automatically dispensed items.

The preferred embodiment of the invention described herein is especially adapted for use with a bar coded credit card 50 of the type presently issued by a number of oil companies. Such a card is shown in FIGURE 2 of the drawings. As illustrated, it is of a size to conveniently fit within a customer's billfold. The name 51 of the issuing company is normally imprinted on the face of the card along with the name 53 of the credit card holder. Each account is assigned a different identification number 55. In accordance with the system in widespread use with business machines, the account number is suitably a ten digit number ranged in three groups of three digits each and one group of one digit. The spacing and shape of the numbers is standardized for use on existing business machines. Each of the digits is also represented by a five bit binary code which consists of two small embossments 57 formed in the card beneath each digit. In the form shown, there are five possible locations for the embossed areas representing each digit. In accordance with this code, the position of the two embossments 57 determines the digit represented. The embossed areas are normally in the shape of small bars; hence, the card is commonly referred to as a bar coded card. For purposes of the present invention, apertures rather than embossments could suitably be provided.

Figure 3:
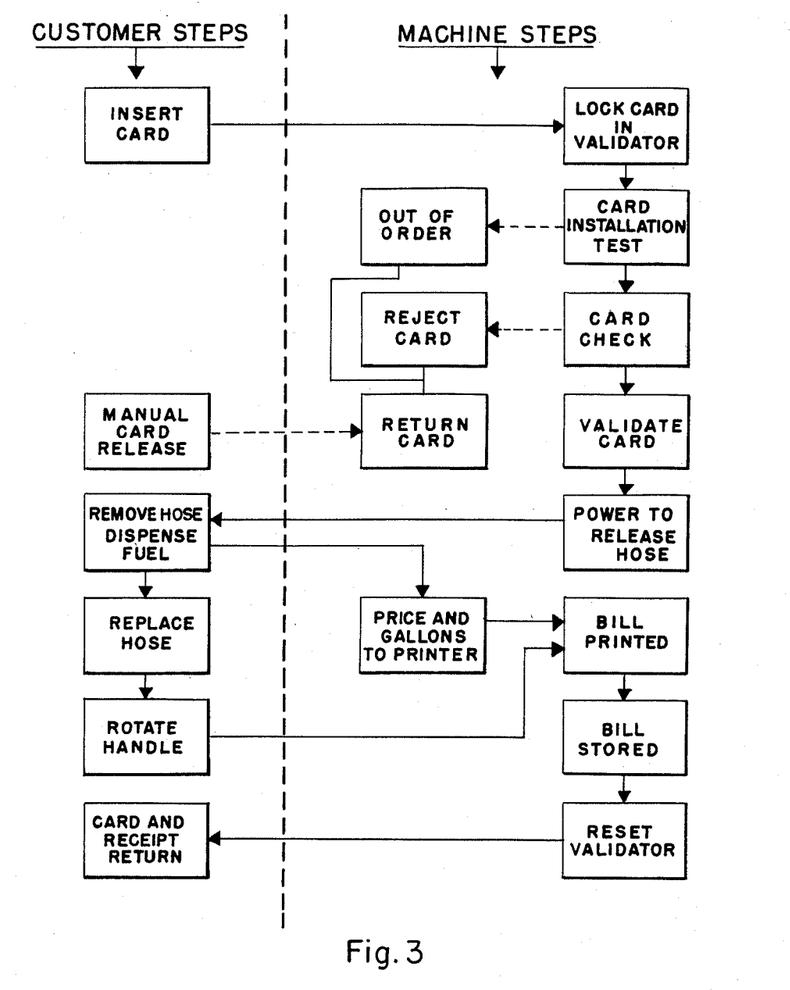
FIGURE 3 is a flow diagram showing the operations performed by the customer and the exemplary apparatus described herein in the course of consumating a purchase and sale of gasoline.
Figures 4, 5, 6, 7, 8:
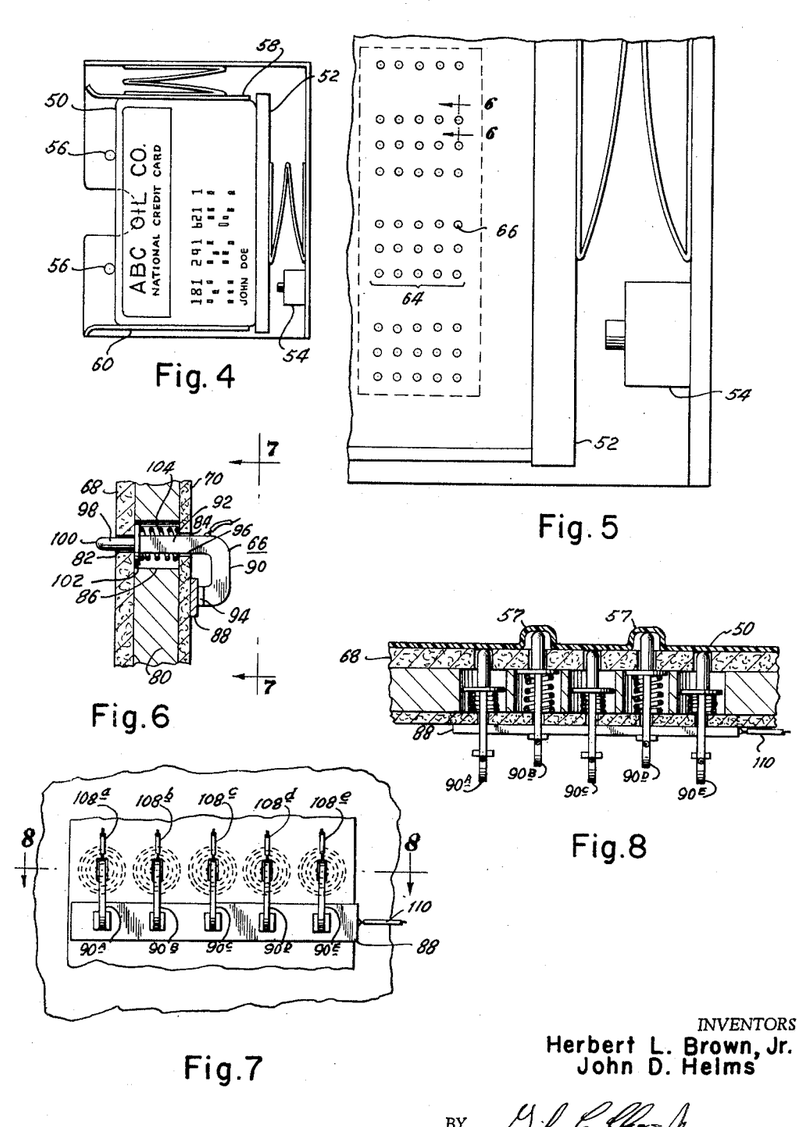
FIGURE 4 is a view illustrating the manner in which a credit card is positioned in a card holding slot provided by the specific example of the invention described herein.
FIGURE 5 is an enlarged fragmentary view of a portion of the card holder slot illustrating the details of a preferred type of card reader for use in practicing the present invention.
FIGURE 6 is a view, partially in cross section, taken along line 6—6 of FIGURE 5 illustrating the details of the contacts utilized in the 50 switch card reader provided by the present invention.
FIGURE 7 is a rear elevation view taken along line 7—7 of FIGURE 6 illustrating additional details of the card reader.
FIG. 8 is a view, partially in cross section, taken along line 8—8 of FIGURE 7 which further illustrates the manner of operation of the card reader provided by the present invention.

As indicated in the flow diagram shown in FIGURE 3 of the drawings, the initial step in operation of the apparatus is to insert the card 50 into the slot 32. As best seen in FIGURE 4 of the drawings, the card 50 is inserted in the slot far enough to cause a spring biased member 52 to bear against the contact of a switch 54. When the switch 54 is closed, it applies power to a solenoid, not shown, causing pins 56 to be pushed into place across the opening of the slot 32, thereby locking the card 50 in place within the slot 32.

As the operator of the apparatus inserts the card 50 into the slot 32, the card will be pressed forward sufficiently to provide adequate clearance for the pins 56, which serve to lock the card in place, to pass across the opening of the slot 32. Thereafter, as the operator removes his fingers from the card, the spring biased member 52 and the spring biased member 58 press the card 50 against the pins 56 and the stationary member 60. When the card is biased against the pins 56 and the member 60, the indentations forming the bar code are aligned with the 50 switch card reader 62.

The 50 switch card reader 62, as best illustrated in FIGURE 5, forms a part of the slot 32 in which the card is inserted and is seen to comprise 10 rows 64 of switches, each row being formed of 5 individual switches 6. The rows 64 of switches 66 are spaced apart on common centers with the bar coded embossments 57.

As best seen in FIGURE 6, the card reader is suitably formed of two layers of insulating material 68 and 70 separated by an insulating spacer 80. Concentric openings 82, 84 and 86 are formed in the layers 68 and 70 and the spacer 80 respectively. Each of the switches 66 includes a movable member 90 which is of generally hook shaped configuration and includes a shank portion 92 and a contact portion 94. The shank portion 92 includes a rectangular region 96 which moves in the rectangular opening 84 and serves as a guide to maintain the movable member 90 properly aligned to insure contact with the bus 88. The shank portion 92 also includes a tubular region 98 having a rounded end 100. A rim 102 is provided at the transition point between the region 96 and region 98. A spring 104 bears against the rim 102 and the layer 70, biasing the switch 66 in the closed position with the contact portion 94 bearing against the bus 88. The openings 82 and 84 are smaller than the opening 86, providing a compartment 106 in which the rim 102 and spring 104 may move. With the contacts of the switch 66 closed, the rounded end 100 of the movable member 90 extends through the opening 82 slightly, as shown.

As best seen by reference to FIGURES 7 and 8, the bus 88 provides a common contact for each of the movable members 90A–90E included within a single row of switches. Leads 108A–108E are attached to each member 90A–90E respectively and lead 110 is attached to the bus 88.

When the credit card 50 is inserted into the slot 32 and locked into position as described previously, it will bear against the layer 68, causing those switches which do not register with one of the embossments 57 to open. Thus, as illustrated in FIGURE 8, the members 90A, 90C and 90E do not register with one of the embossments 57 and are opened as the card 50 bears against the layer 68. The members 90B and 90D project into the raised embossments 57, remaining in the closed position.

In accordance with the preferred embodiment of the invention, the bus 88 is connected to a source of potential through line 110. If one of the switches is open, no potential will appear at the lead 108 associated therewith, denoting a binary zero. If the contact is closed, a potential will be present, denoting a binary 1. The binary number produced at leads 108A–108E as power is applied to line 110 of one of the rows of switches will indicate a particular digit of the identification number.

Figure 9:
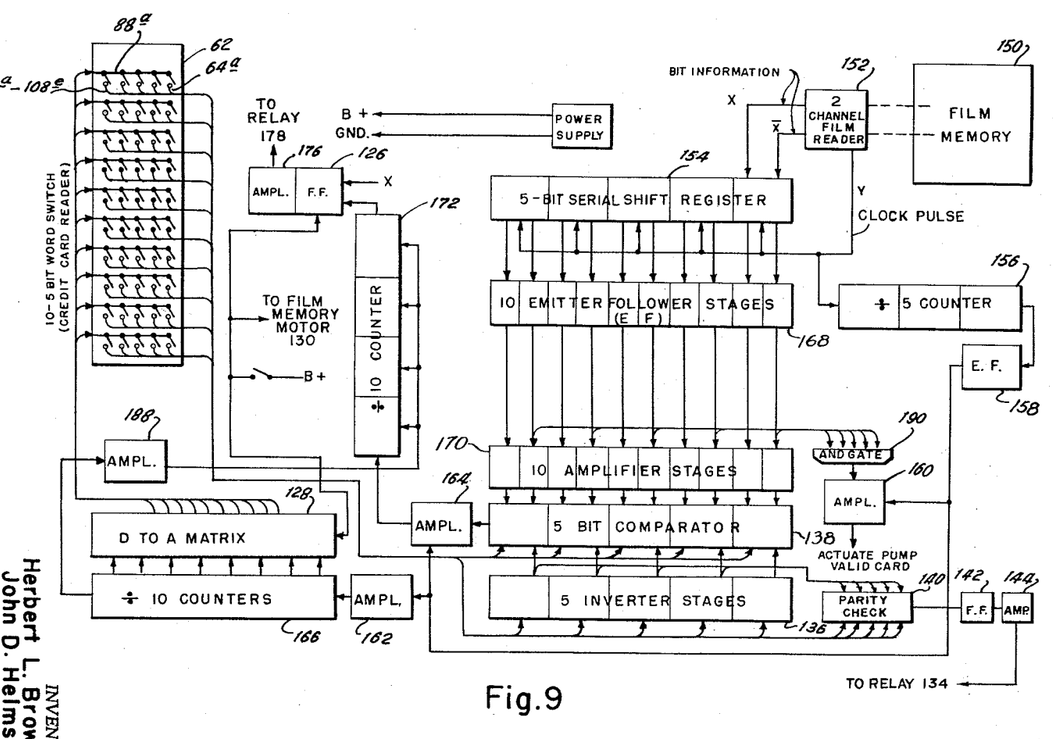
FIGURE 9 is a block diagram illustrating the operation of the card reader, comparator, and memory in the course of determining whether the identification number of the card utilized is valid or invalid.
Figure 10:
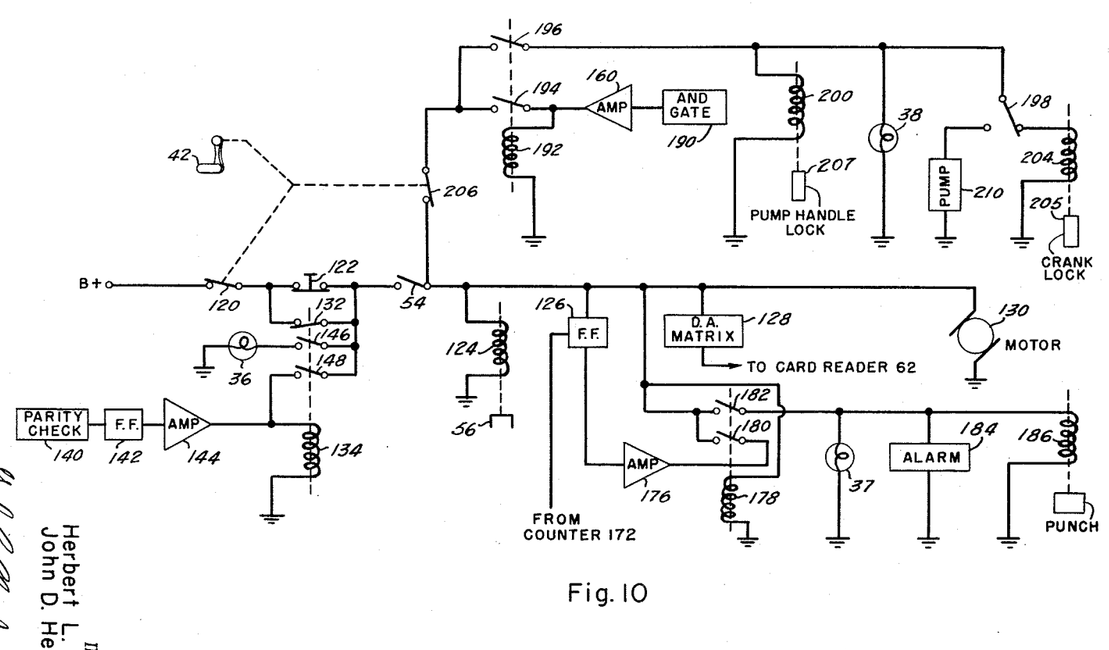
FIGURE 10 diagrammatically illustrates the manner in which the operation of the present apparatus and the gasoline pump are controlled responsive to signals produced by the card comparator means.

As best understood by reference to FIGURES 9 and 10 of the drawings, a source of potential denoted herein as B+ is applied through normally closed, crank operated switch 120 and a normally closed push button switch 122 to one side of the switch 54. As the switch 54 is closed responsive to insertion of the card 50 into the slot 32, power is applied to the winding of a solenoid 124 which is effective to move the pins 56 into place across the front of the slot, locking the card in place. Power is also applied to one side of a flip-flop 126, through a digital analogue matrix 128 to the 50 switch card reader 62, and to a motor 130 which drives the film memory 150. As the crank handle 42 is normally locked and the normally closed contact 132 of relay 134 is connected in shunt with the push button switch 122, once the credit card has been inserted into the slot 32 of the apparatus provided by the present invention, it is impossible for the operator to regain possession of the card until the machine has made a determination that either it is not reading the card correctly, or the card is valid, or the card is invalid.

As mentioned above, as the switch 54 is closed, it will apply power in the digital to analogue converter 128. The digital to analogue converter will cause power to be applied to the bus 88A associated with the first row of switches 64A. As mentioned previously, the potentials present on the leads 108A–108E associated with the first row of switches perform a 5 bit binary number. Each of the lines 108 is connected to one of the 5 inverter stages 136 and to one channel of the 5 bit comparator 138 and to the parity checker 140.

The output of each of the 5 inverter stages 136 is the binary complement of the binary bit applied to each stage. The output of each of the 5 inverter stages 136 is applied to one channel of the 5 bit comparator 138 and to the parity check 140. The parity check 140 and the 5 channel comparator 138 are thereby provided with both the binary bit and its complement.

If the parity check indicates that the card reader 62 is producing more or less than two binary ones, it will produce an output pulse which is applied to a flip-flop 142. The flip-flop 142 produces a positive going pulse responsive to the signal from the parity check which turns the amplifier 144 on. The output of the amplifier 144 is effective to energize the relay 134, causing contact 132 to open and contacts 146 and 148 to close. As contact 148 closes, it applies a B+ potential to the winding of relay 134, maintaining the relay energized after the end of the pulse produced by the flip-flop 142. The source of B+ potential is also applied through contact 146 and lamp 36 to ground, causing the lamp 36 to become lit and indicating either the wrong type of card or improper operation of the card reader 62. Thereafter, in accordance with the instructions printed on the instruction plate 34, the operator may depress the push button 122 to manually release the card 50. As the contact 132 of relay 134 is open, power will be removed from the solenoid when the push button 122 is depressed, retracting the pins 56 and allowing the card to be ejected from the slot 32. The relay 134 is also de-energized, allowing the contact 132 to return to its normally closed condition and causing the apparatus to return to its original condition.

The film memory 150 is suitably of a conventional two channel type. One channel consists of the invalid card identification numbers expressed in binary form and the second channel consists of a series of clock pulses, indicating the end of a binary number. The output of the two channel film reader 152 is the bit information and its complement represented as X and $\bar{X}$ in FIGURE 9 and the clock pulses represented as output Y. The Y output is applied to each stage of a 5 bit serial shift register 154 and to a divide by 5 counter 156.

As the film memory is scanned by the two channel film reader, a clock pulse Y will be produced which is applied to the shift register to clear the first stage of the shift register and to the counter 156, causing one count to be stored. Thereafter, the binary bit information produced at outputs X and $\overline{X}$ is applied to the first stage of the shift register. A second clock pulse is then applied, causing the information stored in the shift register to shift one stage to the left. The second bit of binary information is then applied to the first stage of the shift register through outputs X and $\overline{X}$.

After 5 clock pulses, 5 binary bits and their complements will be stored in the shift register and 5 pulses will be stored in the divide by 5 counter. The counter 156 will produce an output which is applied through emitter follower 158 to the normally disabled amplifiers 160, 162 and 164. The output of the emitter follower 158 enables the amplifiers 160 and 164 for the duration of the pulse produced by the divide by 5 counter 156.

The pulse produced by the divide by 5 counter is applied through the amplifier 162 to the divide by 10 counter 166, which stores the pulse and causes the digital to analogue matrix to remove power from the first row of switches and apply power to the second row of switches.

The binary information stored in the serial shift register is applied through 10 emitter follower stages 168 and 10 amplifier stages 170 to the 5 bit comparator 138. If the binary number read by the card reader 62 corresponds to the 5 bit binary number stored in the shift register 154, the 5 bit comparator 138 will produce an output which is applied through the enabled amplifier 164 to the divide by 10 counter 172. It is noteworthy that an output of the comparator 138, indicating coincidence between the number stored in the shift register 154 and the binary number read by card reader 62, will only be applied to the counter 172 when amplifier 169 is enabled by an output from counter 156.

After 50 clock pulses from the two channel film reader, 50 binary bits will have been read by the two channel film reader and compared against 50 binary bits from the card reader. The identification number on the credit card will then have been compared against the first identification number stored in the film memory and the divide by 5 counter 156 will have produced 10 output pulses. If the identification number on the credit card corresponds to the identification number read by the two channel film reader, the 5 bit comparator 138 will have produced 10 output pulses which are applied to the divide by 10 counter 172. The divide by 10 counter 172 will produce an output which is applied to the flip-flop 126. As best seen by reference to FIGURE 10, the flip-flop 126 produces an output which is applied to the amplifier 176. The amplifier 176 conducts for the duration of the pulse produced by the flip-flop 174, causing the relay 178 to be energized. When relay 178 is energized, normally open contacts 180 and 182 are closed. As contact 180 closes, it provides a source of holding current through the relay 178, causing the relay 178 to remain energized after the end of the pulse produced by the flip-flop 126. B+ potential is also applied through the contact 182 to ground through parallel connected light 37, alarm 184 and, if desired, a solenoid operated punch 186 which mutilates the invalid card.

In the particular form shown in FIGURE 10, the apparatus is adapted for use in a semi-self-service system wherein attendants are available. When the alarm is sounded, the presence of the invalid card will be brought to the attention of the attendant and he can utilize a suitable key for disabling the B+ potential at which instant the system will return to the initial state and the card will be ejected from the slot. In a completely self-service installation, however, it would be necessary to provide an additional relay operated switch for removing B+ potential from the switch 54 and permitting the system to return to its original state after mutilation of the card.

If the identification number on the credit card does not correspond to the identification number read by the two channel film reader, less than 10 counts will be stored by the divide by 10 counter 172. The divide by 10 counter 166 will produce an output which is applied through amplifier 188 to clear the divide by 10 counter 172. The comparison of the identification number read by the credit card reader against the identification number stored in the film memory will continue until coincidence is indicated between the credit card identification numbers and one of the stored identification numbers or until the credit card identification number has been compared against all of the stored identification card numbers.

The last 5 binary bits on the film memory are of the same type. That is, either 5 binary zeros or 5 binary ones are provided. When 5 binary bits of the same type are applied to the and gate 190, indicating that the identification number on the credit card has been compared against all of the stored identification numbers without coincidence and therefore the presence of a valid card, the and gate 190 will produce an output which is applied through the enabled amplifier 160 to energize relay 192. As relay 192 is energized, it will cause contact 194 to close, applying B+ potential to the relay 192 and maintaining it energized. B+ potential is also applied through contact 196 to the common point of a two position switch 198 and the winding of a relay 200.

The two position switch 198 is operated by the hose handle and will be in the position shown when the hose handle is in position. With the hose handle in position, the B+ will be applied through the switch 198 to energize the relay 204 which disengages a crank handle lock 205. The crank handle lock 205 may be of any suitable mechanical or electrical type for releasably restraining rotation of the crank handle 42. If, at this time, the holder of the valid card should decide not to purchase gasoline, he could regain possession of his card by turning the crank handle. As the crank handle is turned, it first opens the switch 206, causing the pump lock to again engage the pump handle and thereafter open the switch 120, resetting the apparatus. An invoice showing no delivery would also be printed and stored in the machine and a copy of the invoice delivered to the purchaser.

When relay 200 is energized, the pump handle lock 207, which suitably may be a pin, is released permitting the pump handle to be removed. If the purchaser should elect to continue with the transaction, as would normally be the case, at such time as the pump handle was removed from its carriage, the two position switch would apply power to the pump motor 210, permitting gasoline to be delivered when the valve incorporated in the pump handle was operated in the normal manner. Thereafter, when the operator replaces the pump handle in its carriage, the position of the switch 198 would again change, causing the crank lock to be released and removing power from the pump motor. The customer could then retrieve the credit card upon turning the crank handle 42 which would reset the system and print the desired invoice.

The shift register, amplifiers, 5 bit comparator, counters, digital to analogue matrix and parity check utilized in the comparison circuitry are of conventional types well known in the art. Accordingly, a detailed description of the circuitry of these items has not been given. The emitter followers 158 and 168 and amplifiers 144, 160, 162, 164, 170 and 176 are provided for impedance matching and power amplification, and may be eliminated without adversely affecting operation of the system in many installations.

Figures 11, 12, 13, 14, 15:
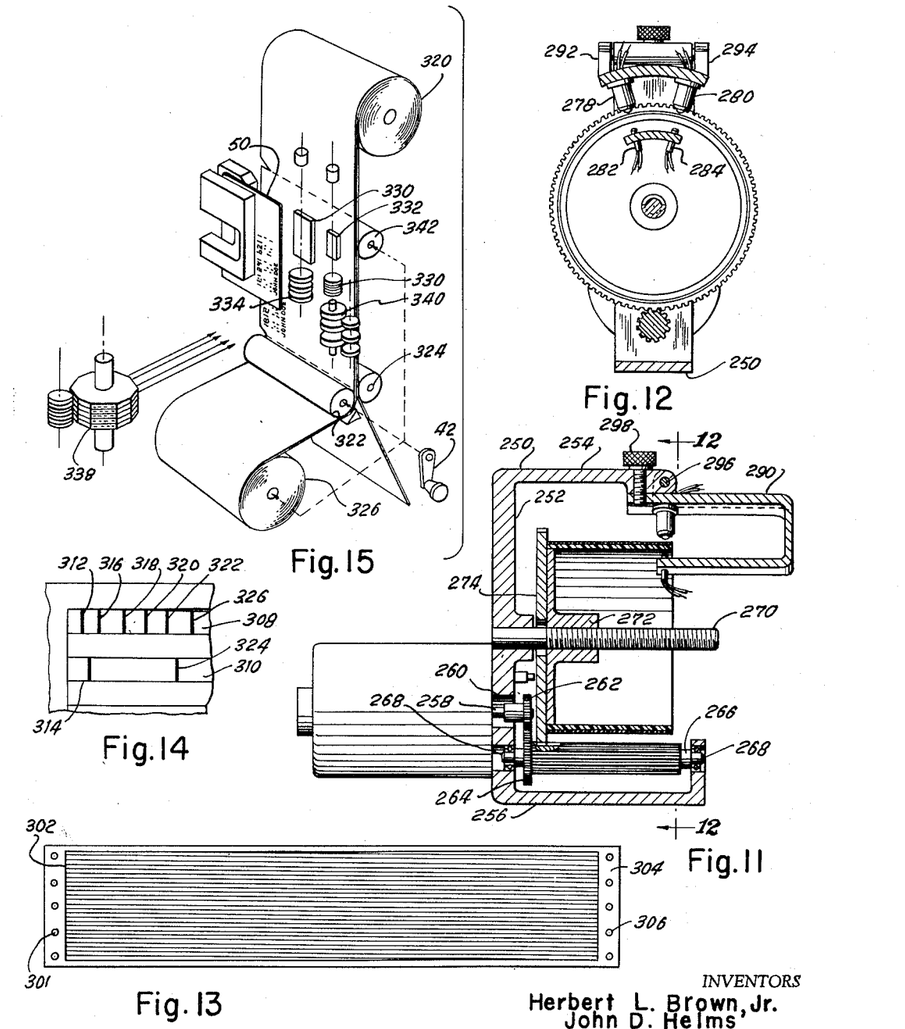
FIGURE 11 is a side elevation view, partially in cross section, of a film memory suitable for use in practicing the present invention.
FIGURE 12 is a view taken along line 12—12 of FIGURE 11 further illustrating the film memory.
FIGURE 13 is a plan view of the film on which information regarding credit card identification numbers is stored.
FIGURE 14 is an enlarged fragmentary view of a portion of the film shown in FIGURE 13 which illustrates the manner in which information is stored on the film.
FIGURE 15 is an exploded perspective view further illustrating the operation of the present invention.

The preferred type of memory for use in practicing the invention is shown in FIGURES 11 and 12. As shown, the film memory apparatus comprises a generally C-shaped housing 250 having a web portion 252 and two perpendicularly disposed end portions 254 and 256. The motor 130 is attached to the lower portion of the web portion 252 as shown. The shaft 258 of the motor extends through an opening 260 provided in the web portion 252 and a gear 262 positioned on the end of the shaft 258 engages a gear 264. The gear 264 is mounted on a splined shaft 266 which turns on bearings 268. A lead screw 270 is also mounted to the web portion 252 as shown. A threaded spider member 272 turns on the lead screw 270. A gear member 274 is concentrically attached to the spider member 272 and engages the splined shaft 266. As the splined shaft 266 is driven by the motor, the gear 274 will cause the spider 272 to rotate and move along the length of the lead screw 270. The splined shaft 266 permits the gear 274 to be driven for all positions of the spider 272 along the lead screw 270. A cylindrical film holding member 274 is mounted to the spider 272 as shown. The walls of the film holding member 274 are formed of translucent or transparent material, such as Plexiglas plastic, whereby light produced by the lamps 278 and 280 may pass through the member 276 and impinge upon the photodiodes 282 and 284. Conventional switching means, not shown, can be provided for reversing the direction of rotation of motor 130 when the spider 272 has traversed the length of the lead screw for returning the spider 272 to its original position.

A generally U-shaped bracket 290 is provided for supporting the lamps 278 and 280 and the photocells 282 and 284. In the form shown, the U-shaped bracket 290 includes ears 292 and 294 which fit on opposite sides of the portion 254 of the C-shaped member 250. A pin 296 passes through the member 254 and the ears 292 and 294 for pivotably mounting the bracket 290 to the member 252. A set screw 298 is provided for adjusting the vertical angle of the path traversed by radiation from one of the lamps 278 or 280 to the opposed photodiodes 282 or 284.

The transparent member 276 is suitably of split construction whereby the film 300, containing the binary information, best seen in FIGURE 13, may be wrapped about or within the member 276 with the end portions 302 and 304 engaging the split formed in the transparent member. When the film is installed onto the transparent member 276, the ends 302 and 304 mate to produce two continuous information channels, one channel containing the binary bit information and the other channel containing the clock pulse information.

In the form well known in the art, a clock pulse or a binary 1 is indicated by a dark line on the film whereas a binary 0 is indicated by a clear portion of the film. When the film is installed on the transparent member 276, light passing between the lamp 278 and the photodiode 282 will traverse one channel as the spider 272 turns on the lead screw 270 and light passing between lamp 280 and photodiode 208 will traverse the other channel. The leads of each of the photodiodes 282 and 284 are connected to a source of suitable potential, not shown, and drive a flip-flop, also not shown. The output of one of the flip-flops provides the X and X̄ bit information (the flip-flop driven by the photodiode traversing the channel containing the bit information) and the flip-flop associated with the other photodiode provides the Y output. By adjusting the thumb screw 298, it is possible to properly position the lamps and diodes to maintain alignment with the information channels.

As mentioned before, but is best seen by reference to FIGURES 13 and 14, the film 300 used in the film memory is of generally rectangular configuration and suitably formed with two end portions 302 and 304, having openings or slots 306 which are adapted to engage pins which are provided in the slit of the transparent member 276. A plurality of lines of binary information are provided on the film 300 by conventional photographic techniques. Each of the lines are parallel to one another but formed at slight angle to the edge of the film such that when the film is properly positioned on the transparent member 276, two parallel spiral lines are provided. As best seen in FIGURE 14, one of the spiral lines 308 comprises the clock pulses and the other spiral line 310 is formed of the identification numbers of invalid cards in binary form.

Assuming that the film shown in FIGURE 14 is moving from right to left, the light passing between the one of the lamps and its associated photodiode would be temporarily interrupted by the dark line 312, producing an output Y. The light passing between the lamp and photodiode which traverse the channel 310 will then be interrupted by the dark line 314, producing an output indicative of a binary 1. It will be observed that a dark line is not provided between lines 316 and 318 on the clock pulse track, indicating the presence of a binary 0. In similar fashion, that portion of the binary track positioned between the lines 318 and 320 is clear, indicating a binary 0 but a line 324 between the clock pulse 322 and 326 indicates a binary 1. Thus, a clock pulse Y would be produced as the line 312 passes between the one of the lamps and its associated photodiode, clearing the first stage of the 5 bit serial shift register 154. The line 314, indicating the presence of a binary 1, will then be read by the film reader, producing outputs X and X̄ which are applied to the shift register 154. A binary 1 is thereby stored in the first stage of the shift register. The clock pulse produced by the effect of the line 316 would cause the binary 1 to be shifted to the second stage of the shift register and two counts would now be stored by the divide by 5 counter 156. The third clock pulse, corresponding to the line 318, would cause the counter to store 3 digits, the binary 1 first read would now be shifted to the third stage of the shift register and the first two stages would contain a signal indicating a binary 0. The clock pulse produced by the line 320 would cause the counter to advance one count and cause the binary 1 to be shifted to the fourth stage of the shift register and the condition of the first three stages of the shift register would indicate the presence of binary zeros. At clock pulse line 322, the binary 1 would be shifted to the fifth stage of the shift register, and the second through the fourth stages would be in a condition indicating the presence of a binary 0. When the second channel of the film reader passes line 324, the output of the film reader would indicate the presence of a binary 1 and would store such a signal in the first stage of the shift register. The divide by 5 counter would produce an output which would enable the amplifiers 160, 162 and 164. In the particular code used, a binary number 10001 corresponds to the digit 1. If the digit read by the card reader 162 is also a digit 1, the 5 bit comparator would produce an output causing the divide by 10 counter to store one pulse.

A suitable type of printer for use in practicing the invention is shown in FIGURE 15 of the drawings. As shown, a plurality of invoices consisting of an original and copy with suitable carbon paper or other reproducing means therebetween is fed from a supply roll 320 between rollers 322 and 324 to a take up roller 326. A wedge shaped divider 328 is provided for separating the original of the invoice from the copy and directing the copy through the slot formed in the case of the apparatus. The copies are suitably perforated to facilitate removal by the customer.

A print slug 330 containing information as to the station operator and address and a merchandise print slug 332 are provided. Manually settable dates 334 and price per gallon information 336 are also provided. The total price print wheels 338 and the quantity delivered print wheels 340 are suitably driven by the meter and computer contained within the gasoline pump housing through conventional tachometer cables (not shown).

At such time as the crank handle 42 is released by operation of the solenoid 204, the operator can rotate the crank. Rotation of the crank 42 is effective to cause the printing roller 342 to press the invoice and copy against the credit card 50, station identification slug 330, merchandise identification slug 332, date printer 334, price per gallon printer 336, total price print wheels 338 and quantity delivered print wheels 340, causing the necessary information to be printed on the invoice and copy. If desired, all of the information can be in machine code to facilitate billing without the necessity for transcribing the data and converting it to digital form. After the printing roller 342 has traversed the necessary distance, it will be released and returned to its original position in which it does not bear against the roll of invoices and further rotation of the crank handle 42 will be effective to cause the rollers 322 and 326 to turn, producing movement of the roll of invoice paper. After the crank 42 has turned to its limit, the printed invoice will have been ejected from the apparatus and a fresh invoice will be in position for printing. The printed invoices are stored on the take up roller 326.

Although the invention has been described principally with respect to a particular example adapted for the dispensing of a single liquid commodity, the principle of the invention can also be adapted for many other types of use. Thus, apparatus such as that shown in FIGURE 16 can be provided. In the form shown in FIGURE 16, apparatus 350, suitable for credit card sales of multiple items, is shown. Thus, keys 352 may be utilized for setting a variety of description of goods sold and prices in the printer. When the credit card 50 is inserted beneath the plate 354, the apparatus provided is effective to read the number on the identification card and compare it against a list of numbers stored in the memory to determine whether the card is valid or invalid. If the card appears valid, a lamp 356 may be lit, indicating the presence of a valid card. On the other hand, if the card is invalid, the lamp 358 will become lit, indicating to the clerk that the card is invalid and should be investigated. At the end of a transaction, a duplicate invoice is delivered to the customer in the manner similar to that described above with reference to the specific embodiment utilizing the gasoline pump. The principles of the invention are also applicable to many other applications utilizing credit cards or identification cards.

Thus, although the invention has only been described with reference to particular embodiments, many changes and modifications will be obvious to those skilled in the art. The invention is, therefore, to be limited not to what has been specifically described herein but only as necessitated by the scope of the appended claims.

What we claim is:

1. Vending apparatus for use with an identification card having an identification number that comprises:

(*a*) A card reader for receiving an identification card and reading the number on said card;
   (*b*) A memory for storing a plurality of identification numbers with which the identification number on said card is to be compared, said memory comprising a film mounted on a light transmitting cylindrical drum and having two parallel spiral information channels defined thereon, one channel having shaded areas denoting the presence of timing pulses, the other channel having shaded areas which indicate the preesnce of a binary 1 and clear areas indicating the presence of a binary 0, the arrangement of such shaded and clear areas on said other channel representing the stored identification numbers in binary code;
   (*c*) Readout means for reading said memory, said readout means comprising:
   (1) Two lamps mounted to direct light through the drum on which said film is mounted and a photosensitive element mounted in opposed relationship to each of said lamps;
   (2) A lead screw for supporting said drum;
   (3) Means for adjustably mounting said lamps and photosensitive element for the light beam from one lamp to pass through said one channel to impinge on one photosensitive element and the light beam from the other lamp to pass through said other channel to impinge on the other photosensitive element;
   (4) A motor; and
   (5) Gear means coupling said motor to said drum to drive said drum along the length of said lead screw and cause said light beams to traverse said channels;
   (6) Said photosensitive elements being effective to produce electrical signals responsive to the interruption of said light beams by shaded areas of said film;
   (*d*) Comparator means for comparing the number read by said card reader against each of the numbers read by said readout means and producing an output responsive to coincidence between the number read by said reader and one of the numbers read by said readout means, said comparator means comprising:
   (1) A shift register having a number of stages equal to the number of binary bits in a binary number representing one of the digits of the identification number;
   (2) Pulse means coupled to the photosensitive element receiving light that passes through said other channel to produce electrical potentials representative of the binary bit read and its complement and apply same to the first stage of said shift register;
   (3) Clock pulse means coupled to the photosensitive element receiving light that traverses said one channel for producing clock pulses responsive to the electrical signal produced by said photosensitive means as the light is interrupted by the shaded areas of the channel;
   (4) Means coupling the output of said clock pulse means to said shift register to shift the information stored in said shift register one stage responsive to the presence of a clock pulse;
   (5) Means coupling the output of said clock pulse means to a counter which produces an output pulse responsive to application of a number of inputs equal to the number of binary bits in a binary number;
   (6) A comparison circuit having a number of stages equal to the number of binary bits in the binary number;
   (7) Means for applying the binary information stored in said shift register to said comparison circuit;
   (8) Means for applying the binary bits produced by said card reader and the complement of such binary bits to said comparison circuit;
   (9) Said comparison circuit being effective to produce an output pulse responsive to coincidence between the binary number produced by said card reader and the binary number stored in said shift register;
   (10) Means for connecting the output of said comparison circuit to the input of a normally disabled amplifier;
   (11) Means for connecting the output of said counter to control the condition of said amplifier;
   (12) Said amplifier being momentarily enabled only resopnsive to an output pulse from said counter;
   (13) Second counter means connected to the output of said amplifier for receiving and storing a pulse responsive to said comparison circuit producing an output when said amplifier is enabled;
   (14) Said second counter means being effective to produce an output indicative of coincidence between the identification number on said card and one of the identification numbers stored in said memory responsive to the storage of a number of pulses equal to the number of digits in said identification number; and (15) Means effective resopnsive to output pulses from the first mentioned counter for sequentially applying power to the rows of switches in said card reader and resetting said second counter means responsive to receiving a number of pulses from the first mentioned counter equal to the number of digits in an identification number;

(e) Means effective following the comparison of said number on said card with all of the numbers stored in said memory without indication of coincidence for indicating lack of concidence;

(f) The presence of a valid card being indicated by one of coincidence or lack of coincidence between the number on said card and the numbers stored in said memory; and (g) The presence of an invalid card being indicated by the other of coincidence or lack of coincidence between the number on said card and the numbers stored in said memory.

2. Vending apparatus as defined in claim 1 wherein the last binary bits stored in said memory are of common type and said means effective following the comparison of said numbers on said card with all the numbers stored in said memory without indication of coincidence for indicating lack of coincidence comprises an and gate connected to receive the outputs of each of the stages of said shift register and produce an output responsive to the storage of a common binary bit in each of said stages.

References Cited by the Examiner
UNITED STATES PATENTS 2,702,380  2/55  Brustman et al. ______ 340—149 X
2,977,024  3/61  Harris.
3,039,582  6/62  Simjian _______________ 194—4

SAMUEL F. COLEMAN, *Primary Examiner.*

ERNEST A. FALLER, JR., *Examiner.*